Figure 1:
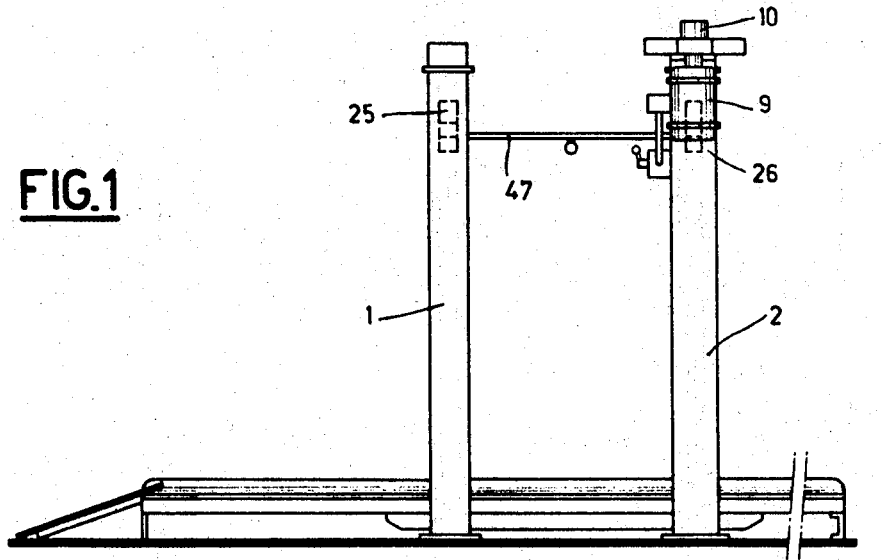

United States Patent

[11] 3,557,908

| [72] | Inventor | Julio Villars<br>Versoix, Switzerland |
|------|----------|---|
| [21] | Appl. No. | 753,443 |
| [22] | Filed | Aug. 19, 1968 |
| [45] | Patented | Jan. 26, 1971 |
| [73] | Assignee | Etablissements J. Villars S.A.<br>Versoix, Switzerland<br>a company of Switzerland |
| [32] | Priority | Aug. 25, 1967 |
| [33] | | Switzerland |
| [31] | | 11,991/67 |

[54] HOISTING INSTALLATION FOR VEHICLES
4 Claims, 4 Drawing Figs.

[52] U.S. Cl. .................................................... 187/8.54,
187/8.59
[51] Int. Cl. .................................................... B66f 7/00
[50] Field of Search ........................................... 187/8.54,
8.59

[56] References Cited
UNITED STATES PATENTS
2,112,481  3/1938  Cox .............................. 187/8.54
3,078,961  2/1963  Powell .......................... 187/8.59
FOREIGN PATENTS
833,872  11/1938  France ......................... 187/8.59

*Primary Examiner*—Harvey C. Hornsby
*Attorneys*—Robert E. Burns and Emmanuel J. Lobato ABSTRACT: This disclosure concerns a vehicle-hoisting installation having a first carrying assembly carried by a four-column support structure which has a device for driving this first carrying assembly. A second carrying assembly independent from the first but supported by the first carrying assembly when it is not hooked to the columns by hooking means, allows the vehicle be supported by the second assembly at points other than the wheels thereof, to maintain the vehicle in a raised position when the first carrying assembly is lowered. The second carrying assembly includes at least two bars which are directed transversely with respect to the direction along which the vehicle is engaged on the installation, and which are disposed with in the longitudinal distance between the vehicle wheels.

3,557,908

HOISTING INSTALLATION FOR VEHICLES

The invention is concerned with a vehicle-hoisting installation which makes it possible to free the wheels of the vehicle while maintaining the same in the desired position, giving ready access below the vehicle, the freed wheels making possible in particular the checking of the steering wheel, the brakes and the suspension.

There have been already proposed elevators having rolling tracks intended to support a vehicle and which have an additional frame which can support the vehicle in places other than the wheels. This frame, positioned above the rolling tracks, has two adjustable longitudinal spacing bars. When the vehicle is brought down, hooks connected to the frame can fix themselves to stationary elements. The body of the vehicle then comes to rest on these bars, the rolling tracks separate from the wheels which are thus liberated and can, for example, be taken off.

The hooks are retractable. If they are withdrawn, the additional frame, not held, invariably follows the rolling tracks in their descending movement and the vehicle arrives at the level of the ground as usual.

This additional frame has great inconveniences: its two longitudinal bars, although adjustable, are not suitable for all vehicles, the volume of the frame interferes with the operator and the cost of the assembly is high.

The present invention has precisely for object to provide a construction which would obviate the above-mentioned drawbacks.

It has for its object a vehicle-hoisting installation comprising a first carrying assembly supported by a least one column comprising a device for driving the first carrying assembly and a second carrying assembly, independent from the first, but supported by the first carrying assembly when it is not hooked to the column by hooking means which permit to maintain the second carrying assembly in a higher position than the first, in such a way that the vehicle is supported by the second carrying assembly, in points other than the wheels thereof, characterized by the fact that the second carrying assembly is constituted by at least two bars which are directed transversely with respect to the direction in which the vehicle engages on the installation.

The accompanying drawings represent, by way of example, one embodiment of the object of the invention.

Figure 2:
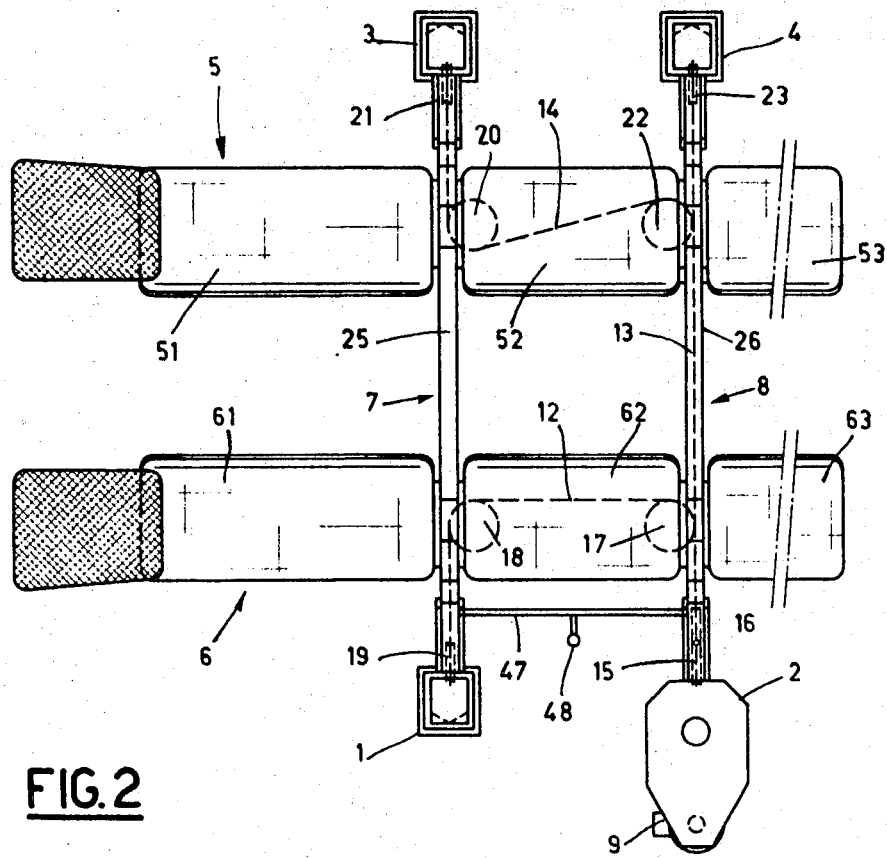
Figure 3:
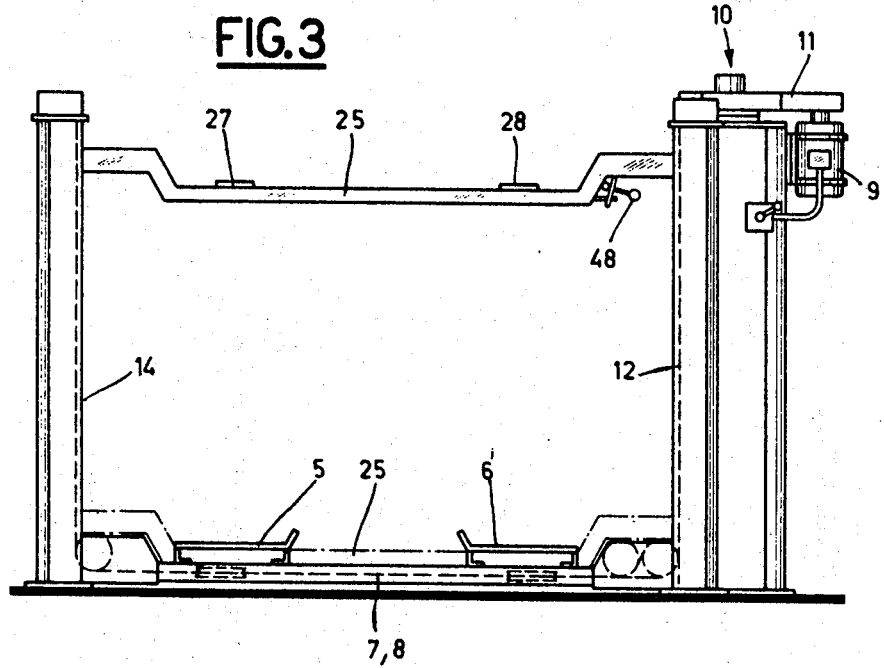
Figure 4:
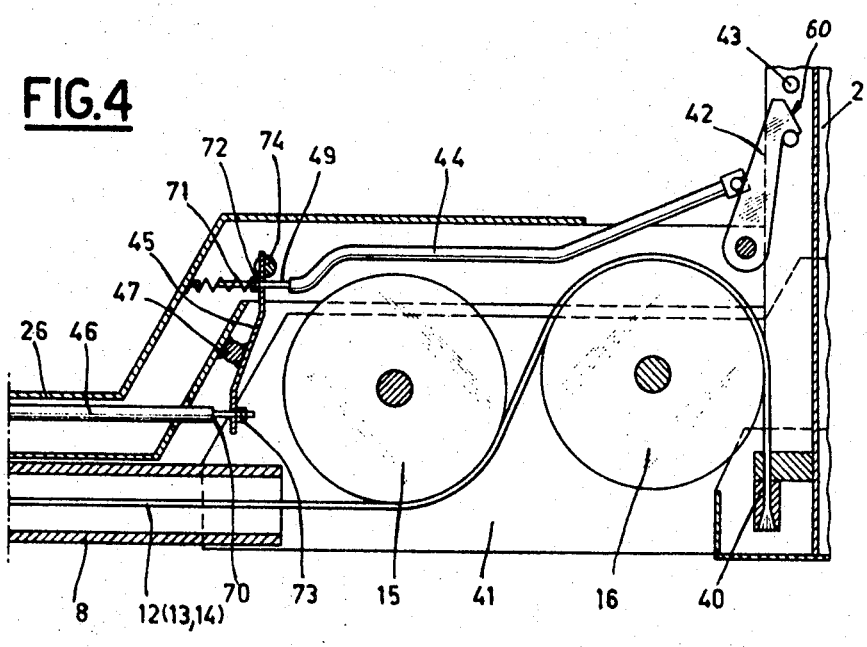

FIG. 1 shows a side elevational view thereof.
FIG. 2 shows a plan view thereof.
FIG. 3 shows a front elevational view thereof.
FIG. 4 shows a detail thereof.

The lifting installation shown in the drawing comprises four vertical columns 1, 2, 3 and 4 supporting and guiding a first carrying assembly constituted by two rolling tracks 5 and 6 secured to two transversal bars 7 and 8 (FIG. 3).

Columns 1, 3 and 4 are carrying columns and column 2 is a power column carrying an electric motor 9 driving a screw 10 through a power transmission 11, driving a nut (not shown) engaging on screw 10 and solid with crossbeam 8. The other extremities of crossbeams 7 and 8 are suspended to the carrying column by means of cables 12, 13 and 14 passing on the pulleys 15, 16, 17, 18, 19, 20, 21, 22 and 23 secured to the carrying assembly and connected to the top of the carrying column. This engagement is described in detail in Swiss Pat. No. 322,756.

The carrying assembly constituted by rolling tracks 5 and 6 differs however from platforms and other moving means known heretofore, by the fact that each of the rolling assemblies are constituted by three elements 51, 52 and 53 and 61, 62 and 63 connected together by bolts, which permit their disassembly and facilitate transport thereof. Each rolling track could be made in a single piece.

The installation comprises a second carrying assembly constituted simply by two bars 25 and 26, to which are secured cushions 27 and 28 on which rests the vehicle on a point other than the wheels thereof when the second carrying assembly is used to support the vehicle.

To this effect transverse bars 25 and 26 can be suspended to the columns by means of a hinged hook 42 pressed by spring 71 to fasten to bars 43 of columns 1, 2, 3 and 4. Lever 48 makes it possible either to retract the four hooks or to free them in order to allow them to hook themselves to bars 43.

When bars 25 and 26 are freed from the columns, they rest on the first carrying assembly and become buried in the rolling tracks as shown by dotted lines on FIG. 3, without interfering with the movement of the vehicle on the rolling tracks.

FIG. 4 shows on a large scale the extremity of bar 26 which cooperates with the power column 2. Bar 26 has been shown here in a position which corresponds to the one shown in dotted lines on FIG. 3, that is, resting on the first carrying element in its lowest position.

Hook 42 is coupled to the hook located at the other extremity of bar 26 through a bar 44 and a bar 46 the end of which is directly pivoted on the other hook which is not shown, bars 44 and 46 being connected mechanically by a pivoted lever 45 the middle part of which is welded to the end of a movable shaft 47 turning in a base fixed to crossbeam 26 the other extremity of which carries a similar pivoted lever actioning a similar mechanism positioned at the end of bar 7.

Bars 44 and 46 are connected to lever 45 in pieces 49 and 70 of a smaller diameter, making it possible for these bars, when the hook is in its engaged position shown in the drawing, to move against an elastic return force, constituted by bar 44, by spring 71 operating by compression between the oblique wall of carrying element 26 and two nuts 72 screwed on the threaded part 49, these nuts 72 serving on the one hand as a stop for lever 47 and additionally serving for adjusting the movement of bar 44. The end 70 of bar 46 is also threaded and carries two nuts 73 against which stops the other end of lever 45. This lever, urged by spring 71 is held by a fixed stop 74 secured to the carrying element.

The hooks are freed by actuating handle 48 acting on shaft 47 which drives jumper 45 against spring 71. During ascent, face 60 of the hooks slides on bars 43.

The operation of the installation flows from the description of the components and from the drawings. The two carrying elements starting in the lowest position, the vehicle is brought on these assemblies which are raised by the power column. When the desired height is reached and the wheels have to be freed, the hooks are engaged in bars 43 by lowering lever 48 which frees the bars associated with the hooks to the action of their return spring. The lower carrying assembly is then lowered and the vehicle rests by its chassis on bars 25 and 26.

In this position the wheels of the vehicle are freed. Moreover, the back as well as the front of the vehicle is readily accessible without any interference from the carrying assembly with the work of the mechanic.

This conception can also apply to the hoisting installation having one or two columns only, in this case, the rolling tracks are supported by sliders sliding on the one or the two columns while the bars 25 and 26 form parts of moving means equipped with hooks or other fastening means and which slide along these same columns.

I claim:

1. A lifting installation for wheeled vehicles comprising a first carrying assembly; support means having four support columns; means connected to said support means and said first carrying assembly for selectively raising and lowering said first carrying assembly; a second carrying assembly independent from said first and comprising two transverse bars disposed intermediate the longitudinal distance between the wheels of a vehicle, when such vehicle is in position to be lifted by said installation, said second carrying assembly being for suspending the vehicle in a raised position when said first carrying means is lowered, and the four columns of said support means being positioned, respectively, adjacent the ends of said bars; attaching means for releaseably connecting the ends of said bars to the four columns of said support means; said first carrying means having means for carrying said bars upwardly when said first carrying assembly is lifted by said support means, and said attaching means having means for automatically connecting the bars to the columns when the first carrying assembly is lowered, wherein said first carrying means is for lifting a vehicle and said transverse bars are for supporting such vehicle in a raised position when the first carrying means is lowered.

2. An installation according to claim 1 wherein said first carrying assembly has rolling tracks and said bars are embedded in said tracks when said bars are carried upwardly by said first carrying means.

3. A lifting installation as set forth in claim 1 in which said attaching means comprise hooked levers pivotally connected on said bars and cooperating projecting members on said columns, and in which said means for automatically connecting the bars to the columns comprise springs mounted on said bars for urging the hooked levers into engagement with said projecting members.

4. A lifting installation for wheeled vehicles comprising support means, carrying means for receiving a vehicle for lifting, means connected to said support means and carrying means for raising and lowering said carrying means, and bar means for suspending a vehicle on said support means after said carrying means is first raised to raise such vehicle and then lowered to a noninterferring position, said bar means including two bars releasably connected to said support means and disposed transversely of such vehicle intermediate the longitudinal distance between the wheels of such vehicle.